US011368600B2

(12) United States Patent
Nithianand et al.

(10) Patent No.: US 11,368,600 B2
(45) Date of Patent: Jun. 21, 2022

(54) UNIVERSAL SECURE IMAGING WORKFLOW

(71) Applicant: THINXTREAM TECHNOLOGIES PTE. LTD., Singapore (SG)

(72) Inventors: Ranganathan Nithianand, Bangalore (IN); Ranga Raj, Bangalore (IN); Teck Lee Low, Singapore (SG)

(73) Assignee: Thinxtream Technologies PTE. LTD., Singapore (SG)

( * ) Notice: Subject to any disclaimer, the term of this patent is extended or adjusted under 35 U.S.C. 154(b) by 0 days.

(21) Appl. No.: 15/154,150

(22) Filed: May 13, 2016

(65) Prior Publication Data
US 2017/0019566 A1 Jan. 19, 2017

Related U.S. Application Data

(62) Division of application No. 14/801,446, filed on Jul. 16, 2015.

(51) Int. Cl.
| | |
|---|---|
| *H04N 1/00* | (2006.01) |
| *G06F 3/12* | (2006.01) |
| *H04N 1/44* | (2006.01) |
| *G06F 21/60* | (2013.01) |
| *G06K 15/00* | (2006.01) |

(52) U.S. Cl.
CPC ......... *H04N 1/4426* (2013.01); *G06F 3/1204* (2013.01); *G06F 3/1222* (2013.01);
(Continued)

(58) Field of Classification Search
CPC .... G06F 3/1204; G06F 3/1222; G06F 3/1226; G06F 3/1236; G06F 3/1238; G06F 3/1244; G06F 3/1245; G06F 3/1247; G06F 3/1248; G06F 3/1255; G06F 3/1272; G06F 3/1276; G06F 3/1285; G06F 3/1286; G06F 3/1287; G06F 3/1288; G06F 3/1289; G06F 3/129; G06F 3/1292; G06F 3/1298; G06F 21/608; G06K 15/4095; H04N 1/00501; H04N 1/00854; H04N 1/4406
(Continued)

(56) References Cited

U.S. PATENT DOCUMENTS

| | | | |
|---|---|---|---|
| 2009/0103124 A1* | 4/2009 | Kimura | G06F 3/1209 358/1.15 |
| 2012/0147420 A1* | 6/2012 | Nishimi | G06F 3/1204 358/1.15 |

(Continued)

*Primary Examiner* — Chad Dickerson
(74) *Attorney, Agent, or Firm* — Michael D. Eisenberg

(57) ABSTRACT

Embodiments disclosed include systems and methods for computer automated print services control comprising authenticating a user credential input via a user device. The system and method includes generating, by a printer driver comprised in the user device, a user interface comprising features supported by a plurality of printing devices. Further, it includes receiving via the user device over the network, a print instruction comprising the features supported by the plurality of printing devices connected to the computer system over the network. And based on the print instruction, generating a print job in an embodiment. Further, based on the user authentication at one of the plurality of printing devices, converting via a gateway, the received print instruction into a format compatible with that printing device and releasing the generated print job for printing at that printing device, according to an embodiment.

8 Claims, 7 Drawing Sheets

(52) U.S. Cl.
CPC .......... *G06F 3/1236* (2013.01); *G06F 3/1238* (2013.01); *G06F 3/1244* (2013.01); *G06F 3/1267* (2013.01); *G06F 3/1276* (2013.01); *G06F 3/1285* (2013.01); *G06F 3/1288* (2013.01); *G06F 3/1292* (2013.01); *G06F 3/1298* (2013.01); *G06F 21/608* (2013.01); *G06K 15/4095* (2013.01); *H04N 1/0023* (2013.01); *H04N 1/00501* (2013.01); *H04N 1/00854* (2013.01); *H04N 1/4406* (2013.01); *G06F 3/1247* (2013.01); *H04N 2201/006* (2013.01); *H04N 2201/0094* (2013.01)

(58) Field of Classification Search
USPC .................. 358/1.11–1.18, 1.9, 2.1, 1.2, 1.5; 709/203, 208, 223, 229; 455/556.2, 557
See application file for complete search history.

(56) References Cited

U.S. PATENT DOCUMENTS

| | | | | |
|---|---|---|---|---|
| 2012/0300245 A1* | 11/2012 | Chatierjee | ............... | H02J 50/10 358/1.14 |
| 2012/0307309 A1* | 12/2012 | Ikegaya | ................ | G06F 21/608 358/1.16 |
| 2013/0077122 A1* | 3/2013 | Mickeleit | ............... | G06F 3/1245 358/1.13 |
| 2013/0111335 A1* | 5/2013 | Tse | ........................ | G06F 3/1208 715/255 |
| 2013/0141747 A1* | 6/2013 | Oba | ...................... | G06F 3/1238 358/1.14 |
| 2013/0229690 A1* | 9/2013 | Sumita | ............... | H04N 1/00408 358/1.15 |
| 2014/0273957 A1* | 9/2014 | Reitz | .................... | H04W 12/003 455/411 |
| 2015/0002884 A1* | 1/2015 | Okumura | .............. | G06F 3/1268 358/1.14 |
| 2015/0153981 A1* | 6/2015 | Iwasaki | ................. | G06F 3/1292 358/1.14 |
| 2015/0154484 A1* | 6/2015 | Iwasaki | ................. | G06F 3/1222 358/1.14 |
| 2015/0199157 A1* | 7/2015 | Xiao | ...................... | G06F 3/1236 358/1.15 |
| 2016/0014112 A1* | 1/2016 | Gunning | ............... | H04L 63/062 713/159 |
| 2016/0026414 A1* | 1/2016 | Sako | .................... | H04B 5/0025 358/1.14 |
| 2016/0065759 A1* | 3/2016 | Sakaguchi | ............ | G06F 3/1236 358/1.15 |

* cited by examiner

UNIVERSAL SECURE IMAGING WORKFLOW

CROSS REFERENCE TO RELATED APPLICATIONS

This application is a Divisional of application Ser. No. 14/801,446 filed on Jul. 16, 2015, entitled "UNIVERSAL SECURE IMAGING WORKFLOW" the contents of which are incorporated by reference in their entirety.

BACKGROUND

Field

Universal Secure Imaging Workflow

In general, the challenge is to be able to detect the presence of and authenticate a user by a print services control system to ensure secure printing and user confidentiality. In the context of secure printing, this translates into releasing print jobs queued by the user when he or she is near a secure printer. Print jobs are released by authenticating a registered user at the secure printer, and releasing a previously issued print job by the user, queued and held by a print server, and released over a network upon user authentication.

Related Art

Previously, the above challenge was addressed in the work environment by placing a badge reader (active element) in the context (say printer, in an embodiment), and the employee authenticating by showing his or her issued badge (passive element). Likewise, in the public space, an encoded token (say a boarding pass with a magnetic strip) would be issued to the user and scanned by a reader at the boarding gate in conjunction with other identity establishing mechanisms.

The issue with these mechanisms were: 1. the reader hardware had to be placed in the context (one per printer or one per boarding gate, for example), and the passive element would be with the user. This would add to the infrastructure cost. 2. The reader hardware had the intelligence to read the user tag, authenticate the user/tag, and release the service.

However, with the proliferation of mobile wireless devices, and especially smart mobile devices, there is an opportunity to swap the active and passive elements, thereby reducing infrastructure cost and consolidating processing and service release at the server.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. Embodiments disclosed include a wireless device configured to generate a print instruction for a selected single or plurality of content items. The device is configured determine a format of the selected content items, and based on the determined format of the selected content items, the device can either convert the selected content to a desired format, or route the selected content to a cloud-based converter, and receive the routed content from the cloud based converter converted to the desired format. The device is further configured to authenticate a user credential at a selected printing device connected to the control system. Additionally, embodiments disclosed include a wireless device configured to convert the generated print instruction into a format compatible with the selected printing device. The print instruction causes the release of the selected content item or items for printing, to the printing device. Other embodiments of this aspect include corresponding computer systems, apparatus, and computer programs recorded on one or more computer storage devices, each configured to perform the actions of the methods.

One general aspect includes in a wireless device included in a computer automated print services control system connected to a plurality of printing devices via a network, a method comprising: generating a print instruction for a selected single or plurality of content items; determining a format of the selected content items; based on the determined format of the selected content items, either converting the selected content to a desired format, or routing the selected content to a cloud-based converter, and receiving the routed content from the cloud based converter converted to the desired format. The method further comprises authenticating a user credential by the wireless device at a selected printing device connected to the control system. Additionally, the method comprises converting the generated print instruction into a format compatible with the selected printing device. Triggered by the authenticated user's print instruction, the method includes releasing the selected content item or items for printing, to the printing device. Other embodiments of this aspect include corresponding computer systems, apparatus, and computer programs recorded on one or more computer storage devices, each configured to perform the actions of the methods.

Embodiments disclosed include a computer automated print services control system comprising: a processor; a memory; a means for communicating over a wired or wireless network; instructions stored in the memory and executed by the processor, which instructions cause the computer system to: authenticate a user credential input via a user device; generate, by a printer driver comprised in the user device, a user interface comprising features supported by a plurality of printing devices; receive via the user device over the network, a print instruction comprising the features supported by the plurality of printing devices connected to the computer system over the network; based on the print instruction, generate a print job; based on the user authentication at one of the plurality of printing devices, convert via a gateway, the received print instruction into a format compatible with that printing device; and release the generated print job for printing at that printing device.

An embodiment further includes in a computer automated print services control system comprising a processor, memory, means for communicating over a wired or wireless network, and instructions stored in the memory and executed by the processor, a method comprising: generating, by a printer driver comprised in a user device, a user interface comprising features supported by a plurality of printing devices; receiving via the user device over the network, a print instruction comprising the features supported by the plurality of printing devices connected to the computer system over the network; based on the print instruction, generating a print job; based on the user authentication at one of the plurality of printing devices, converting via a gateway, the received print instruction into a format compatible with that printing device; and releasing the generated print job for printing at that printing device.

DETAILED DESCRIPTION

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

All Devices especially printers and Multi-Function Printing (MFP) devices have capabilities that can be leveraged using custom commands specific to each manufacturer as against standard commands. Many features like Tray selection etc can be supported using standard commands as well as custom commands. The practice has been to support features using custom commands. Very few capabilities are supported using standard commands. The usage of custom commands leads to using Original Equipment Manufacturer (OEM) specific printer drivers. This practice leads to installing device drivers, leading to multiple drivers in each desktop or computing device. The drivers have to be upgraded regularly to support any new features or/and Operating System (OS) upgrades in an environment where different OEM devices are in use.

Figure 1:
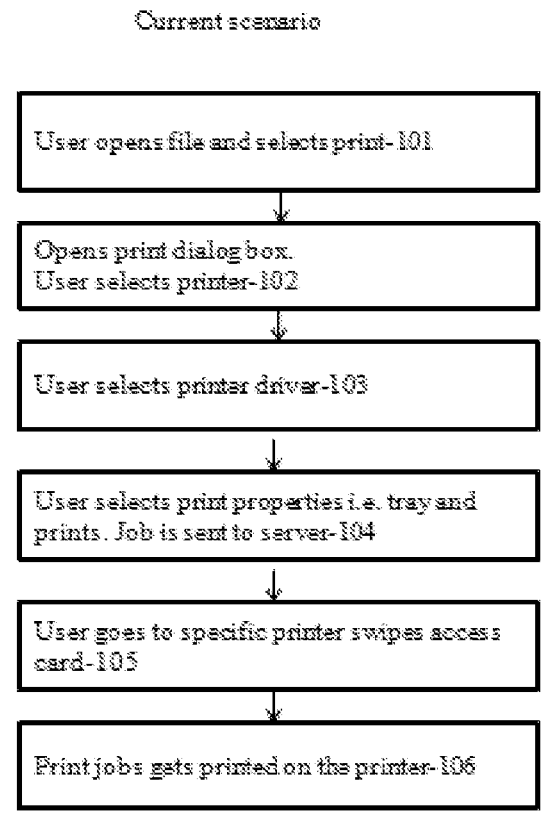
FIG. 1 shows a flow diagram according to aspects of the invention.

Further, in today's workplace, Information Technology (IT) users access various devices, especially printers and Multi-Function Printing (MFP) devices to obtain a tangible output. The current IT users in enterprise, medium and small businesses use standard operating procedures and workflows to see their output. The workflow is optimized to deliver accurate and fast results. As per current practice, the user sends a print job to a device or devices associated with their desktop or computing device, using standardized trays for getting their output in the format they want. Typically, the user prints to Tray 4 (say) if he needs the output on (say) a company letterhead, and that letterhead paper is contained in tray 4. On the other hand, say the user wants a printout on bond paper, and the bond paper is contained in tray 2. Accordingly a print instruction for a print job is executed using paper from tray 2. Usually, the user has prior knowledge of the consumable type available in trays thereby enabling him or her to get the output using the right consumable to meet the need The user environment typically has different types of printers and MFP devices from different suppliers. In the current scenario, the user needs to have drivers of different models from different suppliers to use the devices effectively FIG. 1 illustrates via a flow diagram, current practice in prior art systems. In step 101 the user opens a file and selects the print option. In step 102, the user opens a print dialog box and selects a printer from a single or plurality of connected printers. This step is followed by step 103 wherein the user selects the relevant printer driver according to the selected printer, and in step 104 user printer properties are selected and the created print job is sent to the server (step-104). The print job is held by the server till the user goes to the relevant selected printer and swipes an access card at the selected printer, subsequent to which, the print job is released by the server to the assigned printer. In step 106, the released print job is executed by the selected printer.

Figure 2:
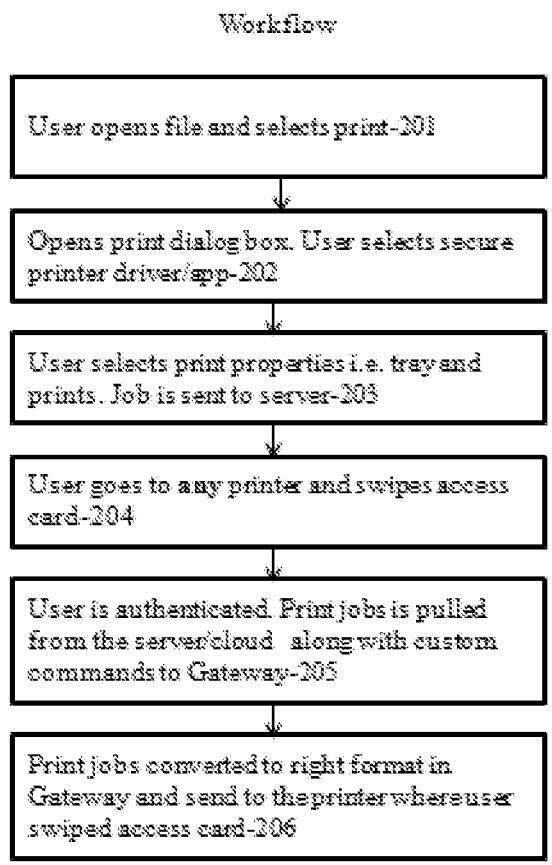
FIG. 2 shows a flow diagram according to aspects of the invention.

FIG. 2 illustrates via a flow diagram the disclosed method according to an embodiment of the present invention. In the first step 201 the user opens a file and selects the print option. In the next step 202 user opens print dialog box and selects a secure printer driver application. In step 203 the user selects print properties i.e. tray and print job, which is then sent to the server. Step 204 involves swiping the user access card at any printer in the network. Upon authentication of the swiped access card, the print job is pulled from the server by the printer at which the access card is swiped along with custom commands to the gateway (step 205). The pulled print job is held in the gateway, and the custom commands cause the held print job to be converted to a format compatible with the selected printer. Once converted, the print job is executed at the printer in step 206.

Embodiments disclosed include a computer automated print services control system comprising: a processor; a memory; a means for communicating over a wired or wireless network; instructions stored in the memory and executed by the processor, which instructions cause the computer system to: authenticate a user credential input via a user device; generate, by a printer driver comprised in the user device, a user interface comprising features supported by a plurality of printing devices; receive via the user device over the network, a print instruction comprising the features supported by the plurality of printing devices connected to the computer system over the network; based on the print instruction, generate a print job; based on the user authentication at one of the plurality of printing devices, convert via a gateway, the received print instruction into a format compatible with that printing device; and release the generated print job for printing at that printing device.

Figure 3:
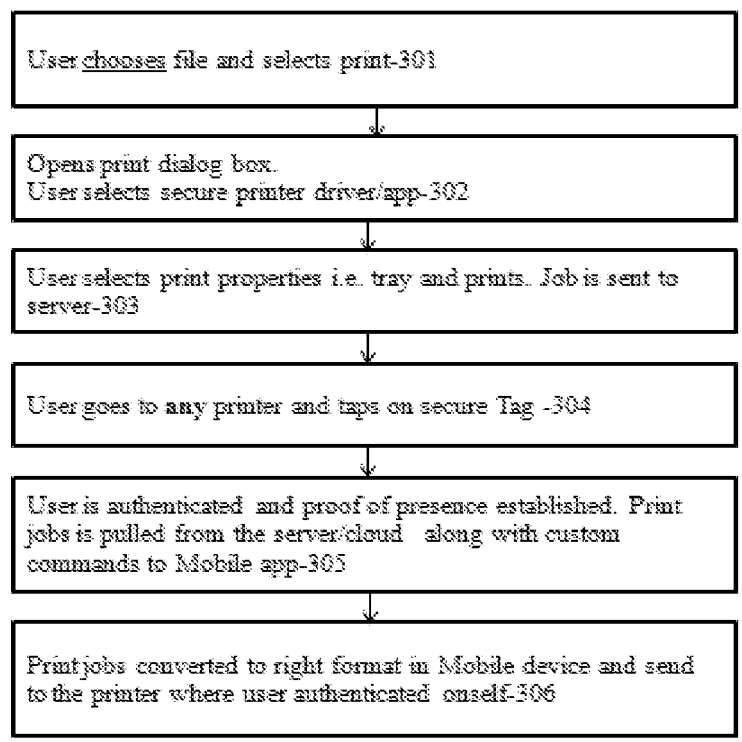
FIG. 3 shows a mobile only work-flow diagram according to an alternate embodiment.

FIG. 3 illustrates via a flow diagram the disclosed method according to an alternate embodiment of the present invention. In the first step 301 the user chooses a file for printing. In the next step 302 user opens print dialog box and selects a secure printer driver application. In step 303 the user selects print properties i.e. tray and print job, which is then sent to the server. Step 304 involves identification of a user mobile device at any printer in the network. The mobile device may identify itself via an NFC tap capability, a Bluetooth or low power Bluetooth functionality, an RFID capability, a bar code or a quick response code, an infrared communication capability, or any other short range communications technology already invented or yet to be invented. Upon authentication of the user mobile device and thus proof or presence of the user, the print job is pulled from the server along with custom commands and sent to the authenticated mobile device (step 305). Finally, in step 306, the print job/s is/are converted to appropriate format in the authenticated mobile device and sent to the printer which authenticated the said device.

Figure 4:
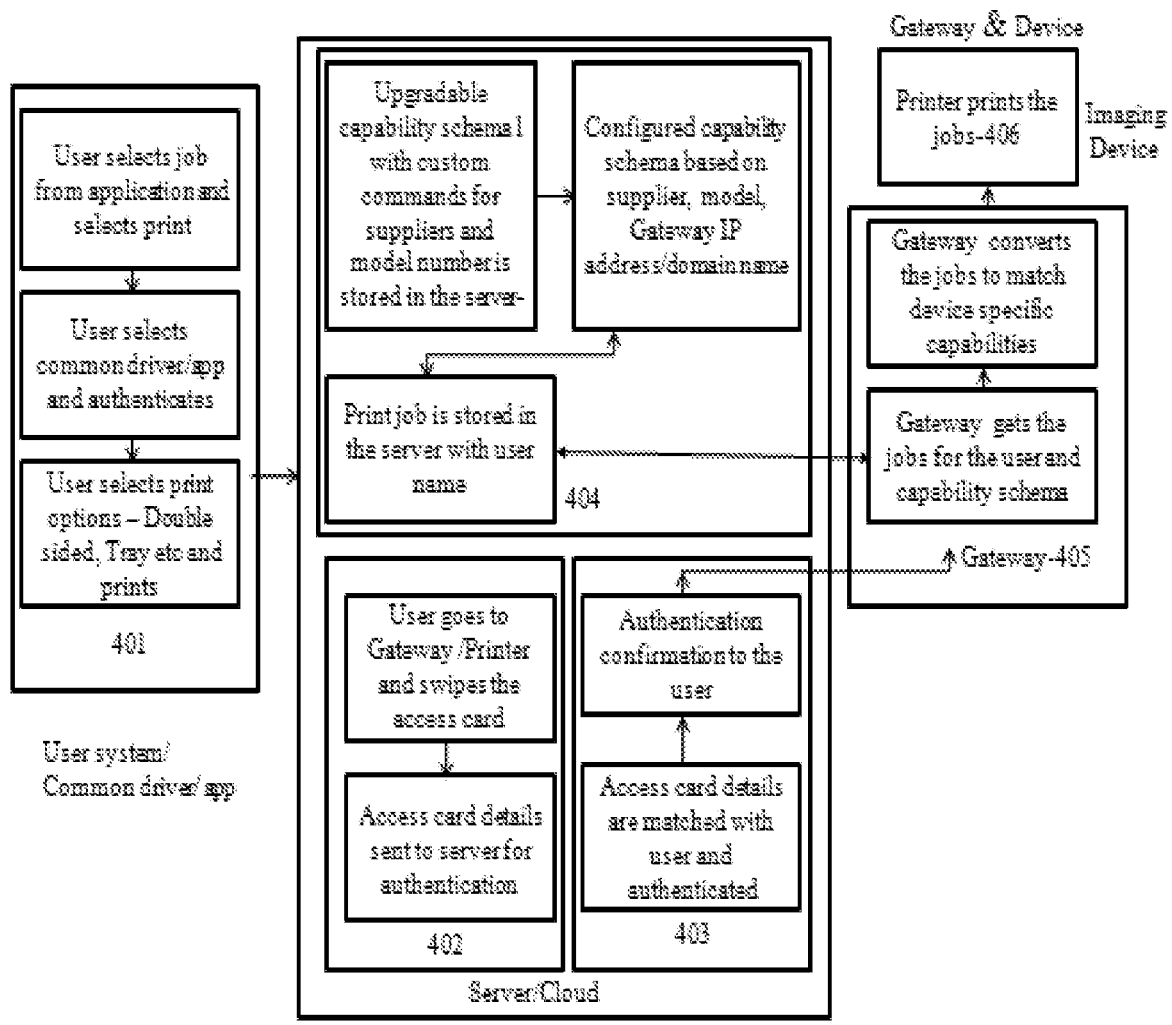
FIG. 4 shows a details process of flow diagram according to aspects of the invention.

FIG. 4 illustrates a system level diagram according to an embodiment. The system comprises a common driver user application 401 having means to allow a user to select a print job and input a print command. Common driver application enables authentication of print selection. The common drive application further allows the user to select from a plurality of print options—for example, a double sided print job, a tray number, etc. The server, accessible via a network over the cloud comprises modules 402, 403, and 404. Module 404 comprises means for storing the print job in the server along with user identification. Further, module 404 allows upgradable capability schema with custom commands for suppliers and printer or/and MFP device model numbers, stored in the server. Additionally and preferably, the configured capability schema is based on supplier model, Gateway IP address, and domain name. Module 402 comprises a means for accepting/recognizing user access card swipe at a gateway or printer, and authenticating access card details at the server. Module 403 comprises a means for matching received access card details with stored user information and for authenticating a legitimate user. Gateway 405 comprises means for receiving the print job stored in the server for a particular user, and for receiving that particular user's authentication confirmation. The gateway is configured to convert the print job to a format compatible with the selected printing device. Printer 406, connected to the network via the gateway is where the user access card is swiped, and where the print job is finally executed.

Figure 5:
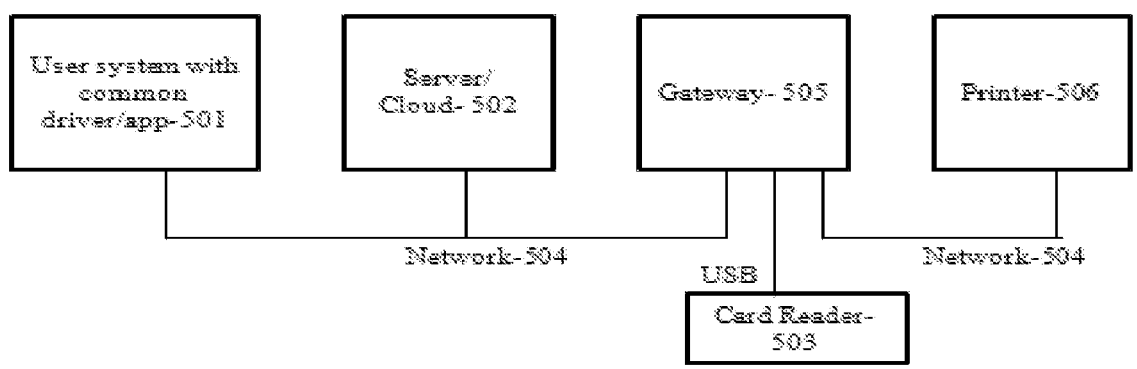
FIG. 5 shows a block diagram according to aspects of the invention.

FIG. 5 illustrates an embodiment section view of the system. The system comprises a user device 501 which includes a common driver application. The device is connected and configured to communicate over a network with server 502, gateway 505, and via gateway 505, with printing device 506. The communication is controlled by the server and the card reader 503, wherein an access card swiped by the user is used verify the user identity stored in the server, before releasing a print job associated with a user issued print command.

Figure 6:
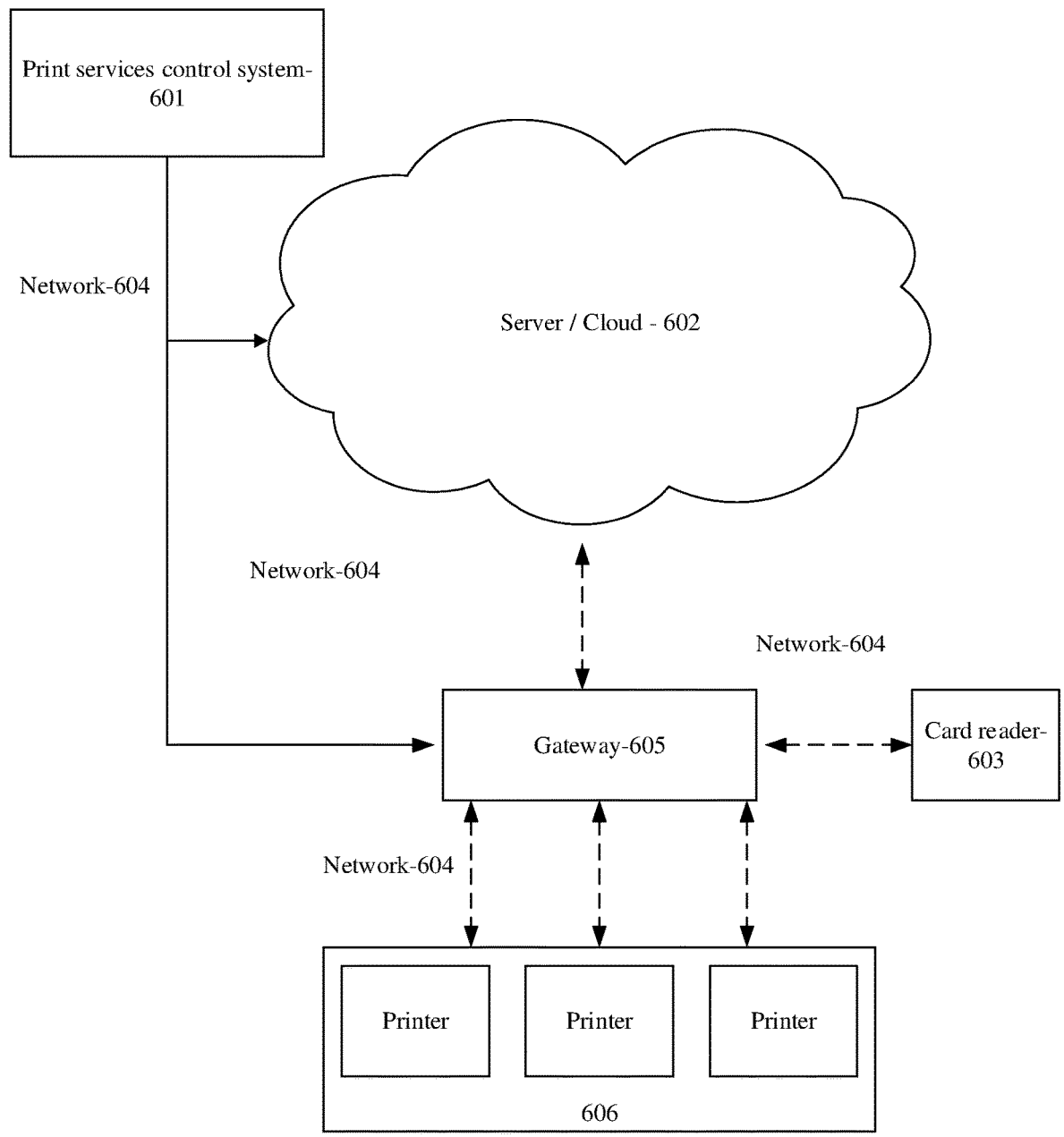
FIG. 6 shows a block diagram according to aspects of the invention.

FIG. 6 illustrates an alternate embodiment of the system. Print services control system 601 is configured to communicate over the network with cloud server 602 and with gateway 605. Further a print command for a print job to be executed is issued by the control system 601, and stored in server 602. The job is released via gateway 605 after being converted into a format compatible with a printer selected from a plurality of print devices 606. The release of the print job is determined by an access card swipe at card reader 603, and authentication of the said access card swipe at the server.

An embodiment includes in the system, converting the received print instruction via the gateway and further mapping of the received print instruction from the user device to invoke a manufacturer specific proprietary command based on the selected printing device, and wherein the mapping comprises translating the received instruction to the manufacturer specific proprietary command. According to an embodiment, the said translating of the received instruction comprises converting the received instruction to a printer specific page description language. [PS, PCL3 (HP), PCL 5/6 etc].

Prior art systems face a serious drawback, in that only certain models can be assigned to certain users, because assigning all models of printing devices from all OEMs will consume substantial space on the user device, and all models may not be easily accessible to all users i.e. not close to the user. This forces the users to remember the devices nearer to them and use them only.

Current security mechanisms using pin numbers, etc. are getting replaced by employee access cards, Biometrics and other forms such as Near Field Communication (NFC) which provide higher security i.e. tightly coupled to the user.

According to an embodiment the user authentication comprises, validating the input user credential at a printing device, wherein the validating is invoked via a short range communication means comprising at least one of an NFC tag, a blue tooth pairing functionality, an active or passive RFID tag, an infrared means, a bar code, and a quick response code, each of which is comprised in a printing device of the print services control system.

Preferred embodiments include validating the input user credential at a printing device, wherein the validating is invoked via an access card associated with the authenticated input user credential.

In an embodiment the system is further caused to recognize the user at the printing device based on the authenticated user credential input via the user device mapped to a user ID assigned to the user. The recognized user is authenticated at/by the printing device based on the assigned user ID. Upon authentication, the generated print job stored on the server, is queued at the selected/chosen printing device, and in turn released for delivery at the printing device. Preferred embodiments include configurations that allow the user to queue a secure print job to any of the printing devices connected to the computer system over the network. According to one embodiment the print job is invoked via an NFC tag attached to a printer and a mobile device comprising NFC functionality, such that the mobile device is caused to read the NFC tag and authenticate itself to the computer system based on the input user credential.

Figure 7:
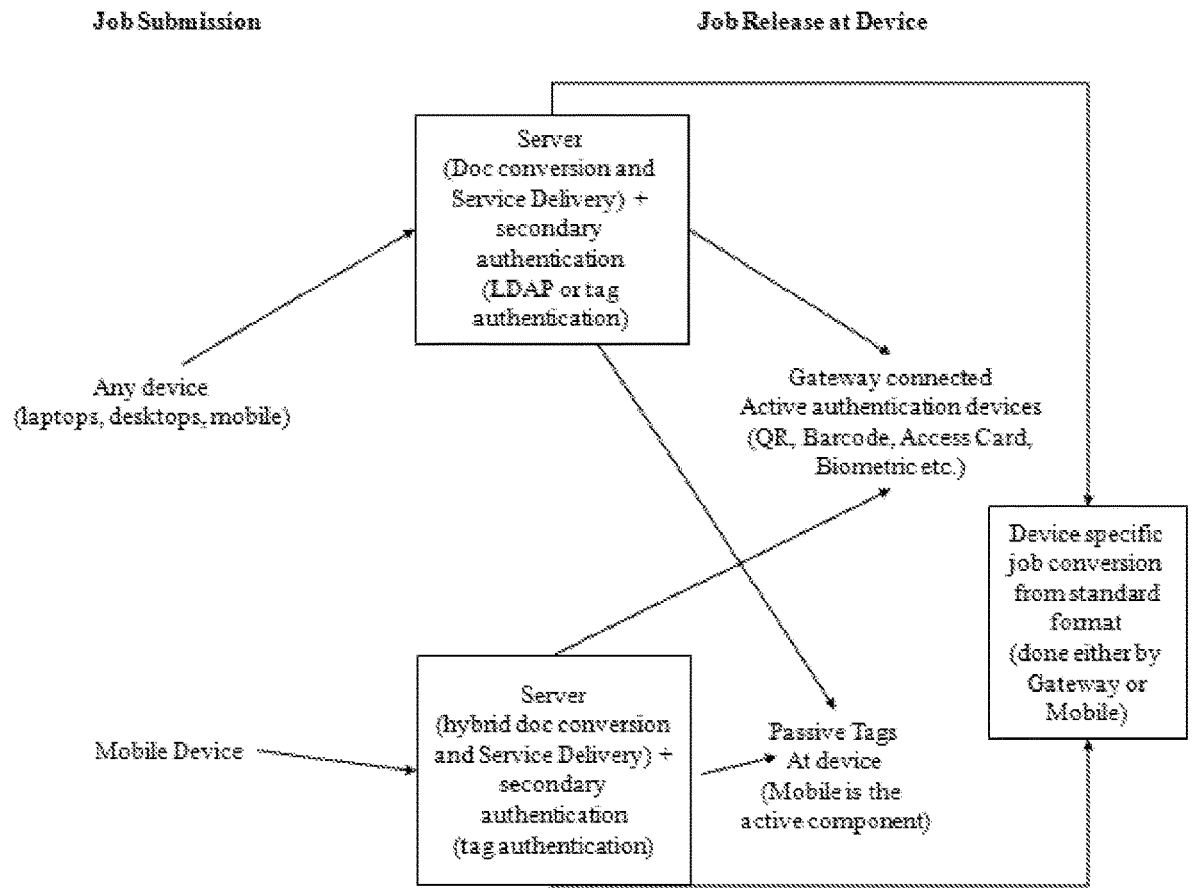
FIG. 7 illustrates an additional embodiment wherein conversion to a printer compatible format is performed by a mobile device or by an associated cloud-based converter supporting the mobile device conversion.

According to an additional embodiment the mobile device is configured to select content and generate a print instruction comprising the features supported by the plurality of printing devices connected to the computer system over the network. Based on the print instruction, a print job is generated. And based on the user authentication at one of the plurality of printing devices, the gateway converts the selected content into a format compatible with that selected printing device. However, according to an alternate embodiment, the mobile device further includes an assessment engine configured to determine the format of the selected content, and to determine if the format can be converted to another desired format compatible with the printers in the network. If it is determined that conversion is possible, a conversion engine comprised in the mobile device, and configured to convert the selected content to the other desired format is caused to convert the said selected content. And based on user authentication at one of the plurality of printing devices, the mobile device sends the converted content to the printing device for printing. Also included, according to another embodiment, is a network routing engine configured to route the content over the network, to a cloud-based converter, if the determined format cannot be converted to the desired format. The cloud-based converter converts the content to the desired format, and resends the converted format back to the mobile device. Finally, upon user authentication of the mobile device at a selected printing device, the print job is released by the mobile device, and printed by the printing device. FIG. 7 illustrates an additional embodiment wherein conversion to a printer compatible format is performed by a mobile device or by an associated cloud-based converter supporting the mobile device conversion.

An embodiment includes in a computer automated print services control system comprising a processor, a memory, means for communicating over a wired or wireless network, and instructions stored in the memory and executed by the processor, a method comprising generating, by a printer driver comprised in a user device, a user interface comprising features supported by a plurality of printing devices. The method includes receiving via the interface generated on the user device over the network, a print instruction comprising the features supported by the plurality of printing devices connected to the computer system over the network. Based on the print instruction, the method includes generating a print job, and based on the user authentication at one of the plurality of printing devices, converting via a gateway, the received print instruction into a format compatible with that printing device. And releasing the generated print job for printing at that printing device.

The user can collect the output from any device connected to the network instead of a specifically assigned device. The converting of the received print instruction via the gateway further comprises mapping of the received print instruction from the user device to invoke a manufacturer specific proprietary command based on the selected printing device, and wherein the mapping comprises translating the received instruction to the manufacturer specific proprietary command. The translating of the received instruction comprises converting the received instruction to a printer specific page description language. [PS, PCL3 (HP), PCL 5/6 etc]. The user authentication comprises, validating the input user credential at a printing device, wherein the validating is invoked via a short range communication means comprising at least one of an NFC tag, a blue tooth pairing functionality, an active or passive RFID tag, an infrared means, a bar code, and a quick response code, each of which is comprised in a printing device of the print services control system.

Embodiments of the disclosed method further comprise recognizing the user at the printing device based on the authenticated user credential input via the user device mapped to a user ID assigned to the user. The method includes authenticating the recognized user at the printing device based on the assigned user ID, queuing the generated print job at the printing device, and releasing the queued context generated print job for delivery at the printing device. Preferably, the method further comprises allowing the user to queue a secure print job to any of the printing devices connected to the computer system over the network.

In an alternate embodiment, the method comprises invoking the print job via the NFC tag attached to a printer communicatively coupled to a mobile device comprising NFC functionality, such that the mobile device is caused to read the NFC tag and authenticate itself to the computer system based on the input user credential.

According to an additional embodiment, the method includes configuring the mobile device for selecting content and for generating a print instruction for the selected content. Of course, the print instruction is selected according to features supported by the plurality of printing devices connected to the computer system over the network. Based on the print instruction, a print job is generated. And based on the user authentication at one of the plurality of printing devices, the gateway converts the selected content into a format compatible with that selected printing device. However, according to an alternate embodiment, the method includes, determining via an assessment engine comprised in the mobile device, the format of the selected content, and further determining if the format can be converted to another desired format compatible with the printers in the network. If it is determined that conversion is possible, the method proceeds to convert via a conversion engine comprised in the mobile device, the said selected content to the said desired format. And based on user authentication at one of the plurality of printing devices, the method includes sending by the mobile device the converted content to the printing device for printing. Also included in the method, according to another embodiment, is a routing step via a network routing engine configured to route the content over the network, to a cloud-based converter, if the determined format cannot be converted to the desired format. This is followed by a converting step by the cloud-based converter, which is configured to convert the content to the desired format, and to resend the converted format back to the mobile device. Finally, upon user authentication of the mobile device at a selected printing device, the print job is released by the mobile device, and printed by the printing device.

Alternate embodiments include modifications and variations as would be apparent to a person having ordinary skill in the art. An example embodiment can be implemented for secure printing in a hospital, at a corporate organization, a bank, etc. For example, an issuer issues a job to a server and then switches to a requester mode at any imaging device to authenticate himself or herself, and collect the desired output. An alternate mode includes a delegating mode, wherein the issuer issues the job and delegates to a requester(s) for the requester(s) to authenticate themselves to collect desired outputs. Applications can also be varied. For example, systems and methods disclosed can be used to book and receive tickets/passes to a movie or event, to create a travelers or cashier's check and redeem the created check at a terminal (such as an ATM machine), to create or apply for and redeem a coupon or voucher, to redeem a received doctor's prescription, etc.

The networked printing or imaging device could have special stationery in trays and depending on the request, the issuer can issue a job that upon authentication by the requester, the desired job gets released. For example, the trays could be assigned or/and designated to only execute specific jobs. Say some trays are healthcare jobs trays—they can have prescriptions, diagnosis results etc. in healthcare. Say other trays are entertainment trays—they can be configured to print tickets/passes for different events or movies. And so on. Again the networked printing devices need not be restricted to conventional 2D devices. There may be, in the network, a variety of imaging devices, medical, entertainment, banking devices, and 3D, 4D or/and other printing devices already invented or yet to be invented.

Embodiments disclosed eliminate the need to have multiple print drivers from different OEMs. Users can use any device connected to the network with the secure print driver installed on the user device. All the current drivers use custom commands making it difficult to replace the driver with a single driver.

There are now available, several short range communication (SRC) protocols, which are supported by major mobile operating systems. The mobile operating system, in general, monitors the communication channel, and then invokes the relevant application that can handle the communication. Near Field Communication (NFC) is one such widely supported communication technology. The FVC tag is generally passive, and contains the following: a tag ID that can be used to uniquely identify the tag; an authentication token that can be used to authenticate the tag itself; an application identifier in a format understood and used by the mobile operating system to invoke the relevant application; and additional context information that can be read by the application itself.

Once the mobile device is in proximity of the NFC tag, the mobile operating system (OS) invokes the relevant application and passes all the other parameters above to it for further processing. From a usability perspective, the OS even prompts the user to download and install the relevant application to the user device, if not already present. The application presents the graphical user interface which allows the user to provide his credentials. The application now has three raw pieces of information—the user credentials, the tag info, and the additional context info, in addition to having established presence of the user in the context due to the nature of the technology. The application sends all of the information to the server, which authenticates the user and the tag. Once authenticated, it can use the additional context information to deliver the service in the context.

Embodiments disclosed allow for one common driver/application irrespective of which manufacturer or OEM equipment is used. This results in a single driver or application as against multiple drivers for different models and different OEMs. Preferred embodiments leverage the gateway to support different Page Description Languages and to support capabilities that use custom commands. Embodiments allow for the current workflow to be preserved, thereby enabling seamless integration into the existing environment. Preferred embodiments enable usage of the data model in the server to send custom commands based on supplier and model to the Gateway and append the commands to execute a print job at a selected print device, thus enabling virtualization of the output device. Traditional workflows have a one-one correlation between the job submission app/driver and the device manufacturer. With the proposed workflow in the disclosed embodiments, secure imaging workflows disassociate the app/driver from the vendor/OEMs equipment and location, thus allowing for the user to swipe and collect their output from any device in the network instead of a specific device. Embodiments disclosed also eliminate the need for expensive hardware the printer terminals, as alternate embodiments utilize user mobile devices as the active component in short range communications initiation. Embodiments disclosed also enable conversion of the pulled print jobs at the user mobile devices into the appropriate format instead of at the gateway, before being sent to the print terminal for printing.

Since various possible embodiments might be made of the above invention, and since various changes might be made in the embodiments above set forth, it is to be understood that all matter herein described or shown in the accompanying drawings is to be interpreted as illustrative and not to be considered in a limiting sense. Thus it will be understood by those skilled in the art that although the preferred and alternate embodiments have been shown and described in accordance with the Patent Statutes, the invention is not limited thereto or thereby.

The figures illustrate the architecture, functionality, and operation of possible implementations of systems and methods according to various embodiments of the present invention. It should also be noted that, in some alternative implementations, the functions noted/illustrated may occur out of the order noted in the figures. For example, two blocks shown in succession may, in fact, be executed substantially concurrently, or the blocks may sometimes be executed in the reverse order, depending upon the functionality involved.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In general, the steps executed to implement the embodiments of the invention, may be part of an automated or manual embodiment, and programmable to follow a sequence of desirable instructions.

The present invention and some of its advantages have been described in detail for some embodiments. It should be understood that although some example embodiments of the Universal Secure Imaging Workflow system and method are described with reference to secure printing across various devices, especially printers and Multi-Function Printing (MFP) devices, the system and method disclosed is reconfigurable, and embodiments include systems that may be dynamically adapted to be used in other contexts as well. It should also be understood that various changes, substitutions and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, and composition of matter, means, methods and steps described in the specification. A person having ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps

We claim:

1. In a computer automated print services control system connected to a plurality of printing devices via a network, a wireless device comprising a processor, a memory unit, instructions stored in the memory unit and executed by the processor, which instructions cause the wireless device to:
    via a common driver user application, allow a user to select a print job and input a print command from a plurality of print commands;
    store the print job in a server along with user identification;
    wherein the print job is stored in the server via a first module comprising upgradable capability schema with custom commands for printer model numbers, and
    wherein the upgradable capability schema is based on a supplier model, a gateway IP address, and a domain name;

via the common driver user application, enable authentication of print selection;

via a second module comprised in the server, authenticate the wireless device at a gateway or printer by matching received user identification details at the gateway or printer with stored user identification in the server;

based on authentication of the wireless device, convert the print job by the gateway to a format compatible with a selected printing device; and release the print job by the selected printing device.

2. The wireless device of claim 1 wherein the wireless device is configured to:

initiate the print job in the printing device from the plurality of printing devices via a short range communication antenna comprised in the wireless device.

3. The wireless device of claim 1 wherein the wireless device is further configured to:

map a generated print instruction from the wireless device to a manufacturer specific proprietary command based on the selected printing device.

4. The wireless device of claim 3 wherein mapping the generated print instruction comprises converting the generated print instruction to a printer device specific page description language.

5. In a wireless device comprised in a computer automated print services control system connected to a plurality of printing devices via a network, a method comprising:

via a common driver user application, allowing a user to select a print job and input a print command from a plurality of print commands;

storing the print job in a server along with user identification;

wherein the print job is stored in the server via a first module comprising upgradable capability schema with custom commands for printer model numbers, and wherein the upgradable capability schema is based on a supplier model, a gateway IP address, and a domain name;

via the common driver user application, enable authentication of print selection;

via a second module comprised in the server, authenticating the wireless device at a gateway or printer by matching received user identification details at the gateway or printer with stored user identification in the server;

based on authentication of the wireless device, converting the print job by the gateway to a format compatible with a selected printing device; and releasing the print job by the selected printing device.

6. The method of claim 5 further comprising:

initiating the print job in the printing device from the plurality of printing devices via a short range communication antenna comprised in the wireless device.

7. The method of claim 5 further comprising:

mapping a generated print instruction from the wireless device to a manufacturer specific proprietary command based on the selected printing device.

8. The method of claim 7 wherein the mapping of the generated print instruction comprises converting the generated print instruction to a printer device specific page description language.

* * * * *